Oct. 29, 1963  M. L. BENJAMIN ETAL  3,108,511
HYDRAULIC CYLINDER WITH ADJUSTABLE CUSHIONING MEANS
Filed Oct. 26, 1961
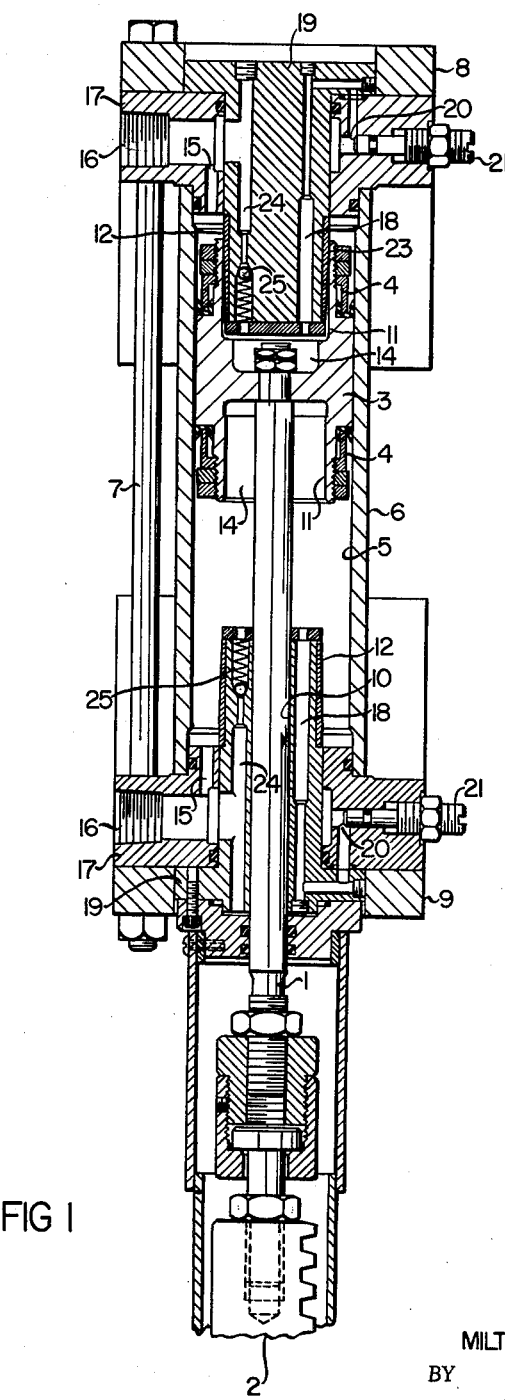
FIG I
INVENTOR.
MILTON L. BENJAMIN &
BY   DAVID D. WALKER
Oberlin, Maky & Donnelly
ATTORNEYS 3,108,511
HYDRAULIC CYLINDER WITH ADJUSTABLE
CUSHIONING MEANS
Milton L. Benjamin, Shaker Heights, and David D. Walker, Chagrin Falls, Ohio, assignors to Erickson Tool Company, Solon, Ohio, a corporation of Ohio
Filed Oct. 26, 1961, Ser. No. 147,943
2 Claims. (Cl. 91—26)

The present invention relates generally as indicated to a hydraulic cylinder having adjustable cushioning means for rapidly and smoothly decelerating the stroke of the piston at one or both ends of a cylinder.

In rotary indexing devices pneumatic cylinders with cushioning means have been employed for actuating and for cushioning the indexing movements. This has been adequate in connection with lightweight indexers, but it has been found that the use of air as the cushioning media is not altogether satisfactory with respect to rapidity of cushioning action in connection with large indexed masses, for example, 700 lbs. or more.

Accordingly, it is a principal object of this invention to provide a hydraulic cylinder with adjustable cushioning means by which indexing movements of heavy masses may be very quickly and smoothly brought to a stop.

It is another object of this invention to provide a hydraulic cylinder with adjustable cushioning means of a character such that the cushioning means does not in any way interfere with desired rapid acceleration of the piston and of the mass indexed thereby.

It is another object of this invention to provide a hydraulic cylinder with adjustable cushioning means having dual restrictors operating conjointly to apply first, a gradually increasing opposition to the piston movement, followed by substantial closing of one restrictor for rendering the other and adjustable restrictor effective to bring the piston to a stop quickly and smoothly.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:
The single FIGURE is a cross-section view of a preferred embodiment of the present invention having cushioning means at both ends of the hydraulic cylinder.

The piston rod 1 herein is coupled to a gear rack 2 which meshes with a gear segment of the indexing device (not shown, see Benjamin et al. Pat. Nos. 2,600,960; 2,754,700; and 2,883,886). The piston rod 1 has secured at its other end the piston 3 which is provided with adjustable U-cup packings 4 or the like, to form a sliding seal in the bore 5 of the cylinder 6. Attached at opposite ends of the cylinder 6, as by the tie bars 7, are cylinder head assemblies 8 and 9 which herein are substantially identical, except that the assembly 9 at the rod end of the piston 3 has an opening 10 therethrough provided with the usual packing rings for making sliding sealed engagement with the piston rod.

Since the cushioning means at both ends of the cylinder 6 are substantially identical, the same reference numerals have been used to denote the same or similar parts. Each end of the piston 3 is formed with a smooth and accurate straight bore 11 which defines a progressively decreasing radial clearance with the corresponding tapered sleeve 12 of the cushioning device as the piston 3 approaches an end of the cylinder 6. Such decreasing radial clearance thus offers progressively increasing opposition to displacement of the fluid from the chamber 14. Such fluid in chamber 14, together with the remaining fluid in the cylinder 6, is displaced through one or more relatively large size openings 15 leading to the port 16 of the cylinder head member 17.

When the aforesaid radial clearance is zero, or nearly zero, the fluid in the chamber 14 at the high pressure that is built up therein, passes through the single passage 18 in the cushioning nipple 19 to the cylinder port 16 via an adjustable restriction 20 formed by the adjustable restrictor valve 21 which has threaded engagement in the cylinder head member 17.

By reason of the provision of the two restrictors, that is, the annular restrictor 23 defined between the piston bore 11 and the tapered sleeve 12 of the cushioning device and the adjustable restrictor 20, the movement of the piston 3 is brought to a rapid and smooth stop with corresponding rapidity and smoothness of deceleration of the large mass which is indexed by movement of the gear rack 2.

It is to be noted that the cylinder port 16 communicates with the area of the cylinder 6 and piston 3 around the cushioning nipple 19 by way of the aforesaid passage or passages 15 and in addition, the cushioning nipple 19 is provided with several passages 24, herein three in number, each containing a check valve 25 so that fluid under pressure can reach the chamber 14. Therefore, when it is desired to move the piston 3 in the opposite direction, the fluid under pressure entering the cylinder port 16 will act on the entire end area of the piston 3, thus to rapidly accelerate the same without creating a vacuum opposition in the cushioning chamber 14.

From the foregoing, it can be seen that the present invention provides for rapid acceleration and deceleration of the piston 3 with corresponding movements of the heavy indexing device operated by the gear rack 2 thereof.

Other modes of applying the principle of the invention may be employed, change being made as regards the details described, provided the features stated in any of the following claims, or the equivalent of such, be employed.

We therefore particularly point out and distinctly claim as our invention:

1. In combination,
a hydraulic cylinder having a head at one end with a port for flow of fluid into and from said cylinder;
a piston reciprocable in said cylinder;
said piston and head defining a chamber therebetween which decreases in volume as said piston moves toward said head;
first and second restrictors communicating said chamber with said port to build up back pressure in said chamber thus to retard movement of said piston toward said head;

said head having a relatively large passage leading from said port to said chamber; and a check valve in said passage permitting flow of fluid under pressure from said port into said chamber for movement of said piston away from said head unimpeded by said first and second restrictors;

said first restrictor being an annular gap of progressively decreasing radial width defined between a cylindrical recess in said piston and a tapered nipple of said head extending into said recess; and said chamber being defined by said recess and nipple.

2. The combination of claim 1 wherein said head has another relatively large passage leading from the space between said nipple and the cylinder wall to said port.

References Cited in the file of this patent

UNITED STATES PATENTS

| | | |
|---|---|---|
| 2,293,167 | Overbeke | Aug. 18, 1942 |
| 2,636,233 | Perkon | Apr. 28, 1953 |
| 2,965,074 | Williamson | Dec. 20, 1960 |